US010290050B2

(12) United States Patent
Melamed

(10) Patent No.: US 10,290,050 B2
(45) Date of Patent: May 14, 2019

(54) LEASE-BASED MANAGEMENT FOR ATOMIC COMMIT PROTOCOLS

(71) Applicant: International Business Machines Corporation, Armonk, NY (US)

(72) Inventor: Roie Melamed, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 15/013,398

(22) Filed: Feb. 2, 2016

(65) Prior Publication Data

US 2017/0221140 A1 Aug. 3, 2017

(51) Int. Cl.
*G06F 17/30* (2006.01)
*G06Q 30/06* (2012.01)
*H04L 12/24* (2006.01)

(52) U.S. Cl.
CPC ..... *G06Q 30/0645* (2013.01); *H04L 41/5006* (2013.01)

(58) Field of Classification Search
CPC ............ G06Q 30/0645; H04L 41/5006; G06F 17/30227
See application file for complete search history.

(56) References Cited

U.S. PATENT DOCUMENTS 5,870,757 A * 2/1999 Fuller ................ G06F 11/1471
8,463,941 B1 * 6/2013 Welch ................ H04L 67/2819 709/238
9,465,648 B2 * 10/2016 Karp ...................... G06F 9/466
9,568,943 B1 * 2/2017 Carman .............. G06F 11/1446
2006/0095438 A1 * 5/2006 Fachan ............ G06F 17/30227
2009/0024491 A1 * 1/2009 Choubey ............... G06Q 10/06 705/28
2012/0185413 A1 * 7/2012 Felter ................ G06Q 30/0283 705/400
2013/0347132 A1 * 12/2013 Burckart ........... G06Q 30/0645 726/30
2014/0108234 A1 * 4/2014 Mayerle ................ G06Q 10/10 705/39
2014/0279383 A1 * 9/2014 Morgan .............. G06Q 40/025 705/38
2014/0351151 A1 * 11/2014 Chiu ................. G06Q 30/0645 705/307
2015/0310188 A1 * 10/2015 Ford ...................... G06F 21/10 726/28

(Continued)

OTHER PUBLICATIONS

Ayobami et al., Atomic Commit in Distributed Database Systems: the Approaches of Blocking and Non-Blocking Protocols, Oct. 2014, 7 pages (Year: 2014).*

(Continued)

*Primary Examiner* — Noosha Arjomandi
(74) *Attorney, Agent, or Firm* — Stosch Sabo

(57) ABSTRACT

A transaction manager can obtain a first lease that dedicates a set of virtual resources to the transaction manager for a first time interval. The transaction manager can send a commit request to one or more resource managers regarding a first transaction. The transaction manager can store respective responses from each respective resource manager. The transaction manager can determine if each response is affirmative, and, if each response is affirmative, the transaction manager can complete the first transaction.

15 Claims, 8 Drawing Sheets

(56) References Cited

U.S. PATENT DOCUMENTS

2017/0024324 A1* 1/2017 Shu .................... G06F 12/1009

OTHER PUBLICATIONS

Nawab, et al., "Chariots: A Scalable Shared Log for Data Management in Multi-Datacenter Cloud Environments", 18th International Conference on Extending Database Technology (EDBT), Mar. 23-27, 2015, Brussels, Belgium, 12 pages.
Gray, et al., "Leases: An Efficient Fault-Tolerant Mechanism for Distributed File Cache Consistency", pp. 202-210. copyright 1989 ACM 089791-338-3/89/0012/0202.
Padilha, et al., "Augustus: Scalable and Robust Storage for Cloud Applications", Eurosys '13, Apr. 15-17, 2013, Prague, Czech Republic. pp. 99-112. Copyright 2013 ACM 978-1-4503-1994-2/13/04.
Park, et al., "A Consistent Group Commit Protocol for Distributed Database Systems", 12 Pages.
Rajalakshmi, et al., "Policy Based Authorization in Cloud System Possible for Trusted Transaction Enforcement", International Journal of Advanced Research Trends in Engineering and Technology (IJARTET), vol. 2, Issue 5, May 2015, pp. 7-11. Copyright 2015 IJARTET.
Mell, et al., "The NIST Definition of Cloud Computing", Recommendations of the National Institute of Standards and Technology, Special Publication 800-145. Sep. 2011. 7 pages.

* cited by examiner

| TM 2_0 TRANSACTION LOG | |
|---|---|
| TRANSACTION ID | VALUE |
| A_1 | DB, . . . MQ, . . . |
| . . . | . . . |
| X_n | DB, . . . MQ, . . . |

| TM SHARED LOG | |
|---|---|
| TM WORKER ID | TIME |
| 0 | 1, 2 |
| 1_0 | 0 |
| 2_0 | 0 |
| 1_0 | 60 |
| 2_0 | 61 |
| 1_0 | 60 |
| 2_0 | 121 |
| 1_0 | 60 |
| 2_0 | 181 |
| 1_0 | 60 |
| 2_0 | 241 |
| 1_0 | 60 |
| 2_0 | 301 |

| TM 2_0 MONITORING LOG | | |
|---|---|---|
| TM WORKER ID 510C | TIME 512C | FAILED LEASE RENEWAL 514C |
| 1_0 | 90 | 0 |
| 1_0 | 180 | 1 |
| 1_0 | 270 | 3 |
| 1_0 | 360 | 4 |

520C, 530C, 540C, 550C

LEASE-BASED MANAGEMENT FOR ATOMIC COMMIT PROTOCOLS

BACKGROUND

The present disclosure relates to atomic commit protocols, and more specifically, to managing atomic commit protocols in a distributed network using leases.

SUMMARY

Aspects of the present disclosure include a method that can include procuring a first lease comprising a set of virtual resources committed to a first transaction manager for a first time interval. The method can further include sending, by the first transaction manager and to one or more resource managers, a commit request for a first transaction. The method can further include storing each respective response to each respective commit request in a virtual resource of the first lease. The method can further include determining each respective response is affirmative and completing the first transaction.

Aspects of the present disclosure further include a system that can include a set of distributed computing resources connected via a network, a plurality of resource managers, a plurality of transaction managers communicatively coupled to the set of distributed computing resources and the plurality of resource managers, where each respective transaction manager is associated with a processor and a memory storing instructions, and a first transaction manager of the plurality of transaction managers. A processor of the first transaction manager can be configured to procure a first lease comprising a portion of the set of distributed resources for a first time interval. The processor of the first transaction manager can be further configured to execute a transaction by causing the processor to request a commit from one or more respective resource managers to execute an operation associated with the transaction, receive a respective response to each respective request, store each respective response in a resource of the first lease, and determine each respective response is affirmative.

Aspects of the present disclosure further include a computer program product comprising a computer readable storage medium having program instructions embodied therewith. The program instructions can be executed by a processor and configured to cause the processor to perform a method comprising procuring, by a first transaction manager, a first lease comprising a set of virtual resources committed to the first transaction manager for a first time interval, sending, by the first transaction manager and to one or more resource managers, a commit request for a first transaction, storing each respective response to each respective commit request in a resource of the first lease, determining each respective response is affirmative, and completing the first transaction.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A illustrates an example transaction log 500A in accordance with embodiments of the present disclosure.

FIG. 5B illustrates an example shared log 500B in accordance with embodiments of the present disclosure.

FIG. 5C illustrates an example monitoring log 500C in accordance with embodiments of the present disclosure.

Figure 1:
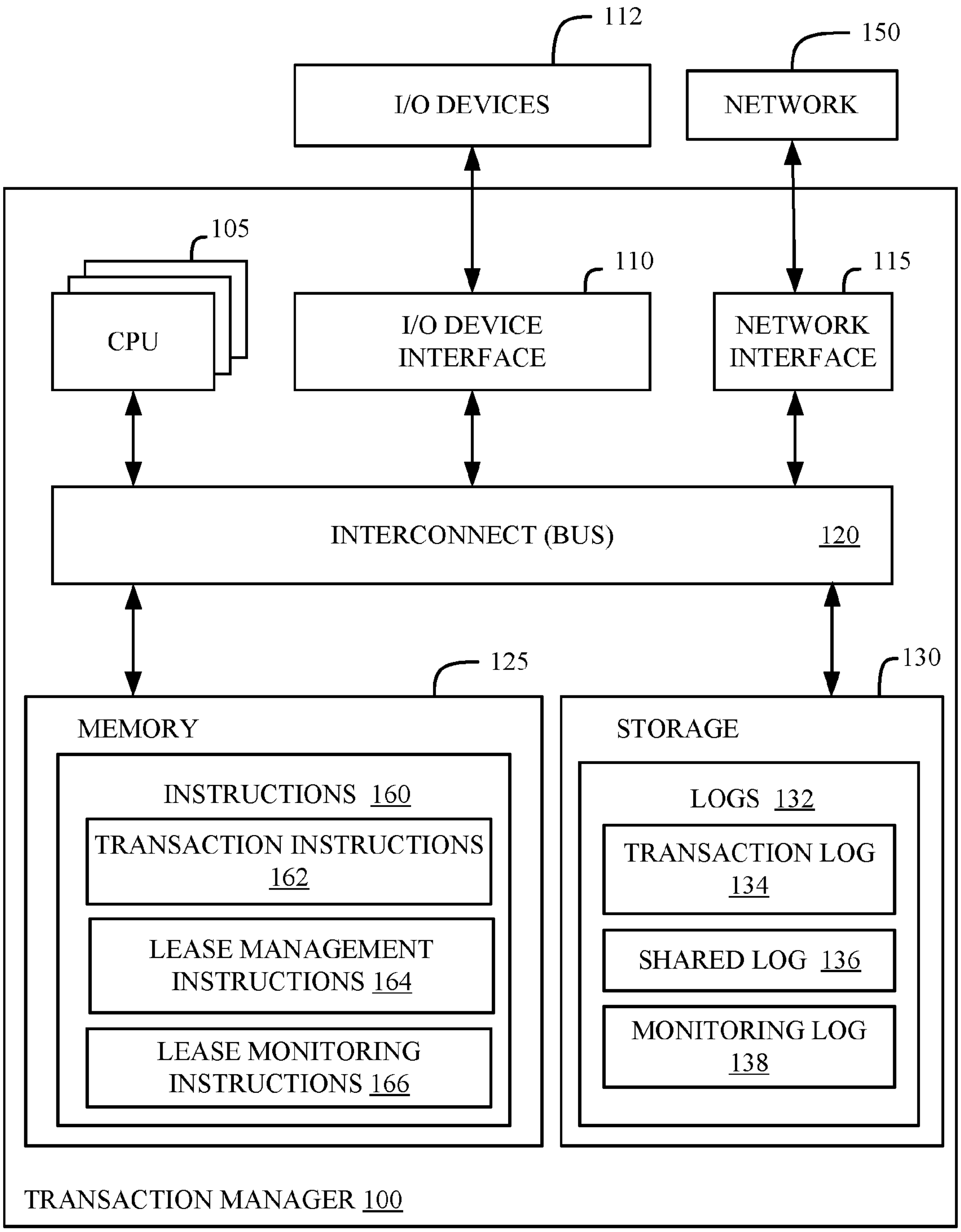
FIG. 1 illustrates a block diagram of a transaction manager in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to atomic commit protocols. More particular aspects relate to managing atomic commit protocols using leases in a distributed network. Although not limited to such applications, an understanding of some embodiments of the present disclosure may be improved given the context of lease-based management of atomic commit protocols in distributed networks.

Atomic commit protocols can apply a set of changes as a single operation. Thus, the operation can be considered successful if each discreet change is successful. In contrast, the operation can be considered failed if any one of the discreet changes fails.

For example, if 100 dollars are transferred from account X to account Y, then atomic commit protocols can ensure that the transaction is considered successful once both 100 dollars is successfully removed from account X and 100 dollars is successfully added to account Y. If atomic commit protocols are not used and the transaction is considered two discreet operations, then the first operation could comprise removing 100 dollars from account X, and the second operation could comprises adding 100 dollars to account Y. In this case, the first operation could succeed and the second operation could fail, resulting in the unaccounted loss of 100 dollars. Likewise, the first operation could fail, and the second operation could succeed, resulting in the unaccounted increase of 100 dollars. Thus, atomic commit protocols can be used in applications requiring each individual operation to succeed in order to consider the set of operations successful. If any single operation fails, all operations can be aborted and returned to a state prior to any operations. Thus, atomic commit protocols are useful in transactional processing in, for example, banking applications, airline reservation systems, credit card systems, stock market transactions, and so on.

Atomic commit protocols rely on persistent storage to reliably store states and execute operations. Aspects of the present disclosure use lease-based consistency protocols using physical clocks to provide pseudo-persistent resources in, for example, virtual machines. Lease-based consistency protocols are advantageous in distributed networks where a set of virtual resources can be unexpectedly re-allocated. A lease can comprise a contract that gives the owner specified rights to a resource for a limited period of time. For example, a lease could provide a management node (e.g., a transaction manager) with a specific amount of resources (e.g., processing power, memory, bandwidth, etc.) associated with a specific location (e.g., a particular node) for a specific period of time (e.g., two minutes).

Aspects of the present disclosure can provide numerous advantages. First, the present disclosure utilizes leased resources and can therefore be implemented in a distributed networking environment lacking persistent storage (e.g., a cloud computing network). Second, aspects of the present disclosure provide a safe transaction methodology (e.g., no disputes among transaction participants leading to permanently locked resources). Third, aspects of the present disclosure can identify failed transaction managers in a finite amount of time. Fourth, aspects of the present disclosure can automatically restart a failed transaction manager and/or reassign a failed transaction to a new transaction manager. It is to be understood that the aforementioned advantages are example advantages, and embodiments of the present disclosure can display, all, some, or none of the aforementioned advantages while remaining within the spirit and scope of the present disclosure.

Referring now to the figures, FIG. 1 illustrates a block diagram of a transaction manager in accordance with some embodiments of the present disclosure. In various embodiments, the transaction manager 100 includes a memory 125, storage 130, an interconnect (e.g., BUS) 120, one or more processors (e.g., CPUs) 105, an I/O device interface 110, I/O devices 112, and a network interface 115. In embodiments, the transaction manager 100 includes an application containing program instructions executable by a processor. In some embodiments, the components of transaction manager 100 are located on a single device, while in alternative embodiments, the components of transaction manager 100 are a collection of virtual resources.

Each processor 105 can be communicatively coupled to the memory 125 or storage 130. Each processor 105 can retrieve and execute programming instructions stored in the memory 125 or storage 130. In some embodiments, each processor 105 can execute methods as shown and described hereinafter with reference to FIGS. 2-4. The interconnect 120 is used to move data, such as programming instructions, between the CPU 105, I/O device interface 110, storage 130, network interface 115, and memory 125. The interconnect 120 can be implemented using one or more busses. The processors 105 can be a single CPU, multiple CPUs, or a single CPU having multiple processing cores in various embodiments. In some embodiments, a processor 105 can be a digital signal processor (DSP). Memory 125 is generally included to be representative of a random access memory (e.g., static random access memory (SRAM), dynamic random access memory (DRAM), or Flash). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the transaction manager 100 via the I/O device interface 110 or a communication network 150 via the network interface 115.

The network 150 can be implemented by any number of any suitable communications media (e.g., wide area network (WAN), local area network (LAN), Internet, Intranet, etc.). In certain embodiments, the network 150 can be implemented within a cloud computing environment or using one or more cloud computing services. In some embodiments, the network interface 115 communicates with both physical and virtual networks.

The transaction manager 100 and the I/O devices 112 can be local to each other, and communicate via any appropriate local communication medium (e.g., local area network (LAN), hardwire, wireless link, Intranet, etc.) or they can be physically separated and communicate over a virtual network. In some embodiments, the I/O devices 112 can include a display unit capable of presenting information to a user and receiving one or more inputs from a user.

In some embodiments, the memory 125 stores instructions 160 while the storage 130 stores logs 132. However, in various embodiments, the instructions 160 and logs 132 are stored partially in memory 125 and partially in storage 130, or they are stored entirely in memory 125 or entirely in storage 130, or they are accessed over a network 150 via the network interface 115.

The instructions 160 can store processor executable instructions for various methods such as the methods shown and described hereinafter with respect to FIGS. 2-4. The instructions 160 can contain transaction instructions 162, lease management instructions 164, and lease monitoring instructions 166.

Transaction instructions 162 can contain processor-executable instructions capable of processing a transaction using atomic commit protocols. Transaction instructions 162 are described in greater detail hereinafter with respect to FIG. 2. Lease management instructions 164 can provide processor executable instructions to procure and maintain a lease for a set of virtual resources. Lease management instructions 164 are described in further detail hereinafter with respect to FIG. 3. Lease monitoring instructions 166 can provide processor executable instructions configured to monitor the lease status of each transaction manager. Lease monitoring instructions 166 are described in further detail hereinafter with respect to FIG. 4.

Logs 132 can comprise a transaction log 134, a shared log 136, and a monitoring log 138. Transaction log 134 can store descriptions of each respective transaction operation, such as, for example, commands sent and received as part of the execution of transaction instructions 162. Transaction log 134 is described in greater detail hereinafter with respect to FIG. 5A. Shared log 136 can comprise a shared log storing each respective transaction manager and the last time each respective transaction manager renewed its respective lease. Shared log 136 can store information compiled from the execution of the lease management instructions 164 of each respective transaction manager. Shared log 136 is described in further detail hereinafter with respect to FIG. 5B. Monitoring Log 138 can comprise a log storing lease refresh failures for each respective transaction manager in the network. Monitoring log 138 can retrieve and store information from shared log 136 according to lease monitoring instructions 166. Monitoring log 138 is described in greater detail hereinafter with respect to FIG. 5C.

Figure 2:
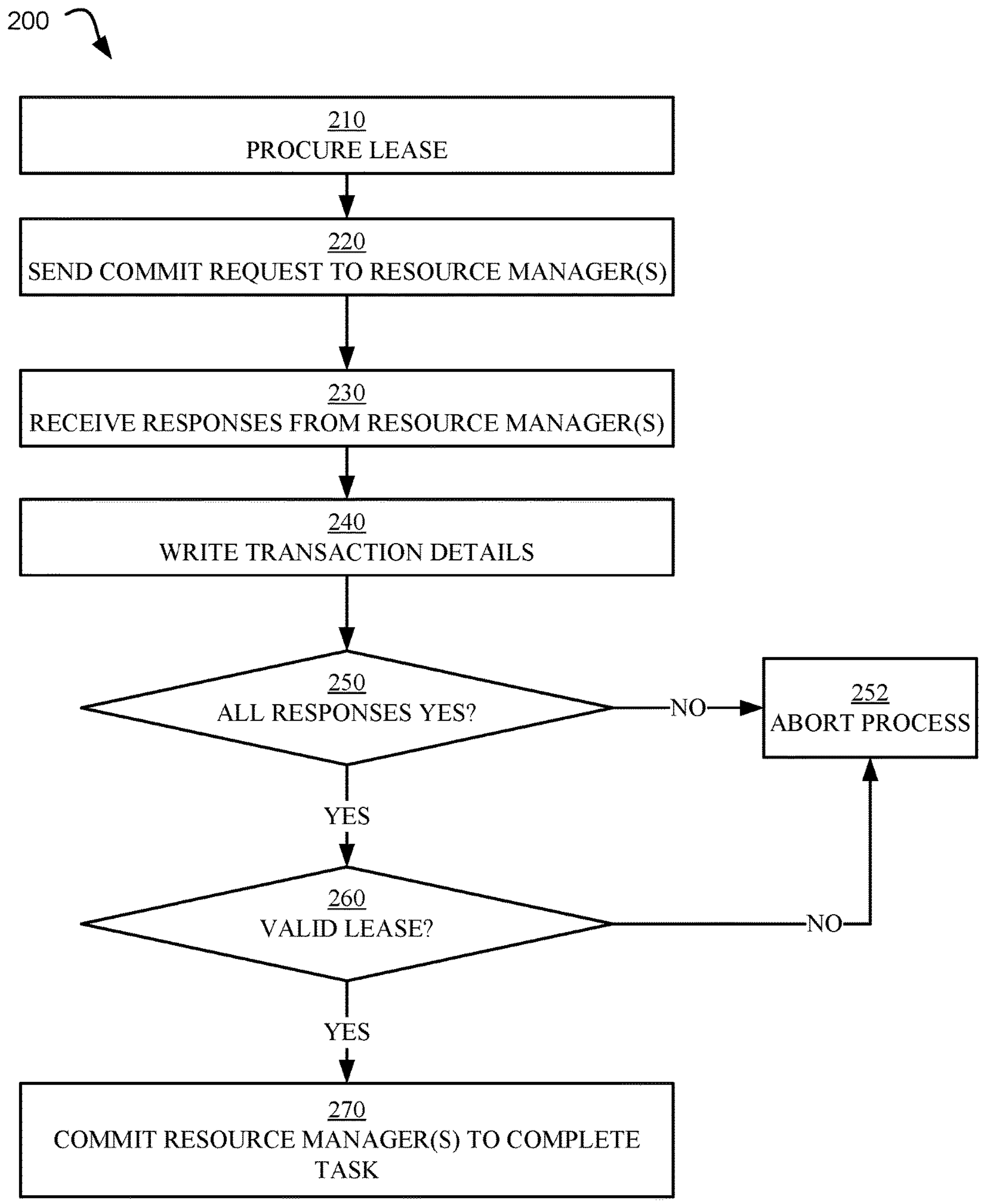
FIG. 2 illustrates an example method 200 for executing a transaction in accordance with embodiments of the present disclosure.

Referring now to FIG. 2, illustrated is an example method 200 for executing a transaction in accordance with embodiments of the present disclosure. The method 200 can be implemented by one or more processors (e.g., processors 105 of FIG. 1) executing a set of instructions (e.g., transaction instructions 162 of FIG. 1).

The method 200 can begin with operation 210 in which a transaction manager procures a lease. The lease can comprise one or more virtual resources obligated to the transaction manager for a period of time. In embodiments, the period of time can be considered a lease expiration time.

In operation 220, the transaction manager can send a commit request to one or more resource managers. A resource manager can comprise, for example, a database, a message queue, or a different resource manager. The commit request can contain instructions applicable to the respective resource manager for a respective transaction.

In operation 230, the transaction manager can receive a respective response (e.g., a vote) from each respective resource manager. The response can be, for example, a "yes" or "no" response, a "commit" or "abort" response, or a different type of response. For each resource manager that responds affirmatively, (e.g., with a "yes" or "commit" response), that resource manager can maintain resources allocated to execute the operation(s) associated with the transaction until it receives a "commit" command from the transaction manager (at which point it will execute the operation) or an "abort" command from the transaction manager (at which point it will release the allocated resources and return to the state prior to receiving the request from the transaction manager).

In operation 240, the transaction manager can store transaction details and/or outcomes on, for example, a computer readable storage medium (e.g., storage 130 of FIG. 1) which can be part of the transaction manager, a part of a virtual resource leased to the transaction manager, or a different computer readable storage medium. In the event the transaction manager should fail, a second transaction manager can overtake the responsibilities of the failed transaction manager and use the stored transaction details to determine the status of the transaction and complete (i.e., commit) or abort the transaction using atomic commit protocols. Thus, in embodiments, no resource managers will be left in a "locked" state having voted "yes" to the transaction manager and indefinitely waiting for a response from a failed transaction manager.

In operation 250, the transaction manager can determine if all responses from the various resource managers are affirmative (e.g., a "yes" or "commit" response). If any response is not affirmative, then the transaction manager can abort the transaction in operation 252. If all resource manager responses are affirmative, the method 200 can proceed to operation 260.

Operation 260 can verify the lease operated by the transaction manager remains valid. The transaction manager can query a transaction log (e.g., transaction log 134), a shared log (e.g., shared log 136), and/or a monitoring log (e.g., monitoring log 138) to verify the lease remains valid. Should operation 260 determine the lease is not valid, the transaction manager can abort the process in operation 252. Should operation 260 determine the lease is valid, the method 200 can proceed to operation 270.

In operation 270, the transaction manager can send a commit message to each respective resource manager. The commit message can cause each respective resource manager to execute the operation. In some embodiments, the sending of the commit message can comprise completion of the transaction.

Thus, FIG. 2 illustrates a method 200 for executing a transaction. The method 200 can comprise procuring a lease, sending commit requests to one or more resource managers, storing transaction details, and completing the transaction.

Figure 3:
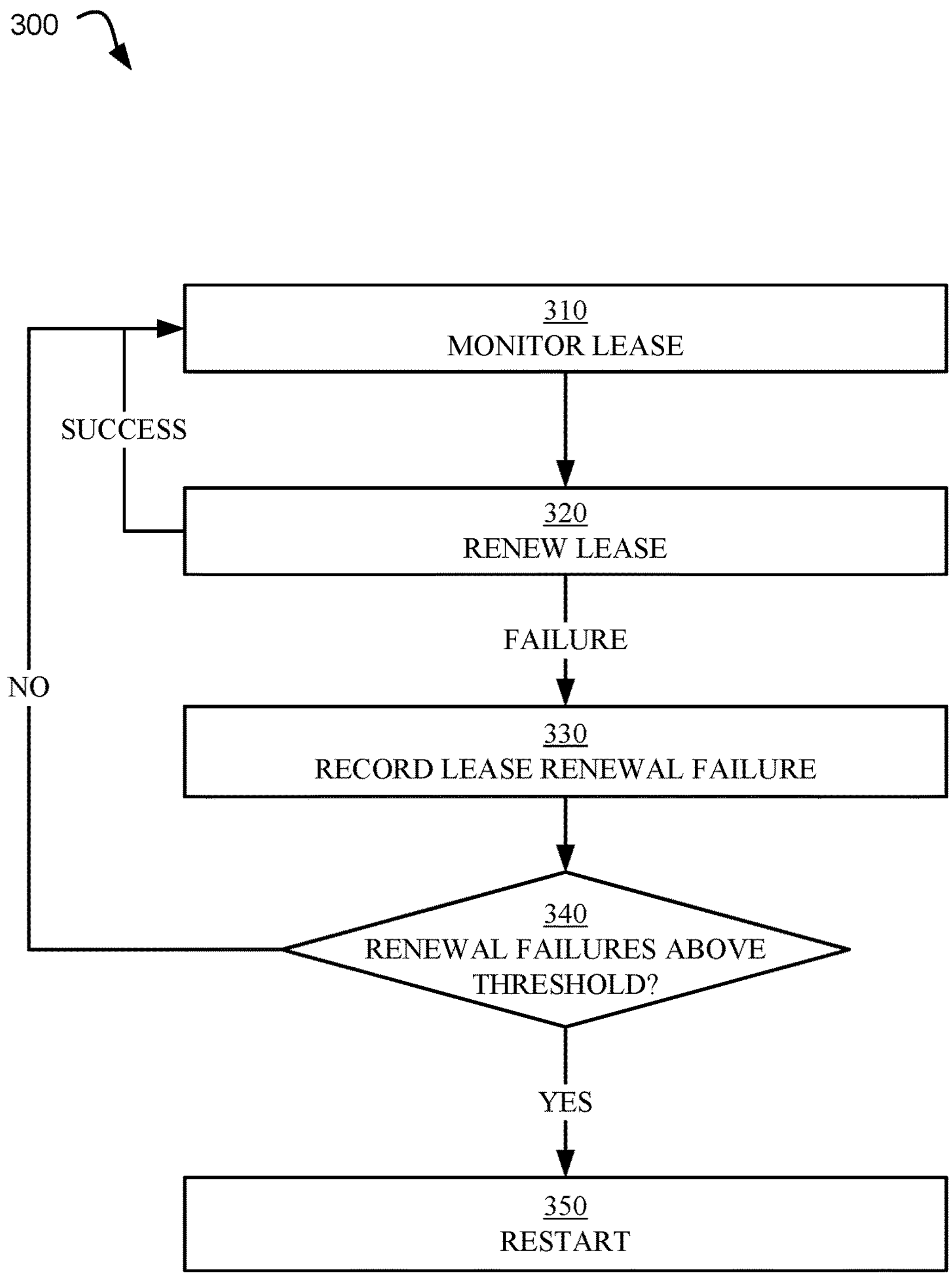
FIG. 3 illustrates an example method 300 for managing a lease in accordance with embodiments of the present disclosure.

Referring now to FIG. 3, illustrated is an example method 300 for managing a lease. The method 300 can be implemented by one or more processors (e.g., processors 105 of FIG. 1) executing a set of instructions (e.g., lease management instructions 164 of FIG. 1). In embodiments, the method 300 can comprise a subroutine of operation 210 of FIG. 2, which can be performed in parallel to the other operations shown in the method 200.

The method 300 can begin with monitoring the lease in operation 310. Operation 310 can comprise, for example, proceeding to operation 320 at each lease refresh time interval. In embodiments, the lease refresh time interval can be less than the lease expiration time interval.

In operation 320, the transaction manager can renew the lease and store the local time in a log shared between each respective transaction manager of a plurality of transaction managers (e.g., shared log 136 of FIG. 1). Should operation 320 successfully renew the lease, the method 300 can return to operation 310 and continue monitoring the lease (e.g., wait a lease refresh time interval before again proceeding to operation 320). Should operation 320 be unsuccessful (e.g., a transaction manager is under a network partition and is unable to communicate with the virtual resource associated with the lease), then the method 300 can proceed to operation 330.

In operation 330, the failure to renew the lease can be recorded. The failure to renew the lease can be recorded in, for example, a lease monitoring log (e.g., lease monitoring log 138 of FIG. 1). Operation 340 can determine if the number of lease renewal failures is above a threshold. In embodiments, the threshold can be called a maximum failure count. Should the number of lease renewal failures remain below the maximum failure count, the method 300 can return to operation 310 and continue monitoring the lease (e.g., retry renewing the lease following a lease refresh time interval). Should operation 340 determine the number of failed lease renewals is above the maximum failure count, the method 300 can proceed to operation 350.

In operation 350, the transaction manager can restart itself. In embodiments, the transaction manager can create a new incarnation in a shared log (e.g., shared log 136 of FIG. 1) and attempt to procure a new lease as part of restarting.

Thus, the method 300 illustrates an example method for managing a lease. The method 300 can include monitoring a lease, attempting to renew the lease at each predefined lease refresh interval, recording each unsuccessful lease renewal, and, in some cases, restarting the transaction manager in cases where a number of failed lease renewals exceeds a maximum failure count.

Figure 4:
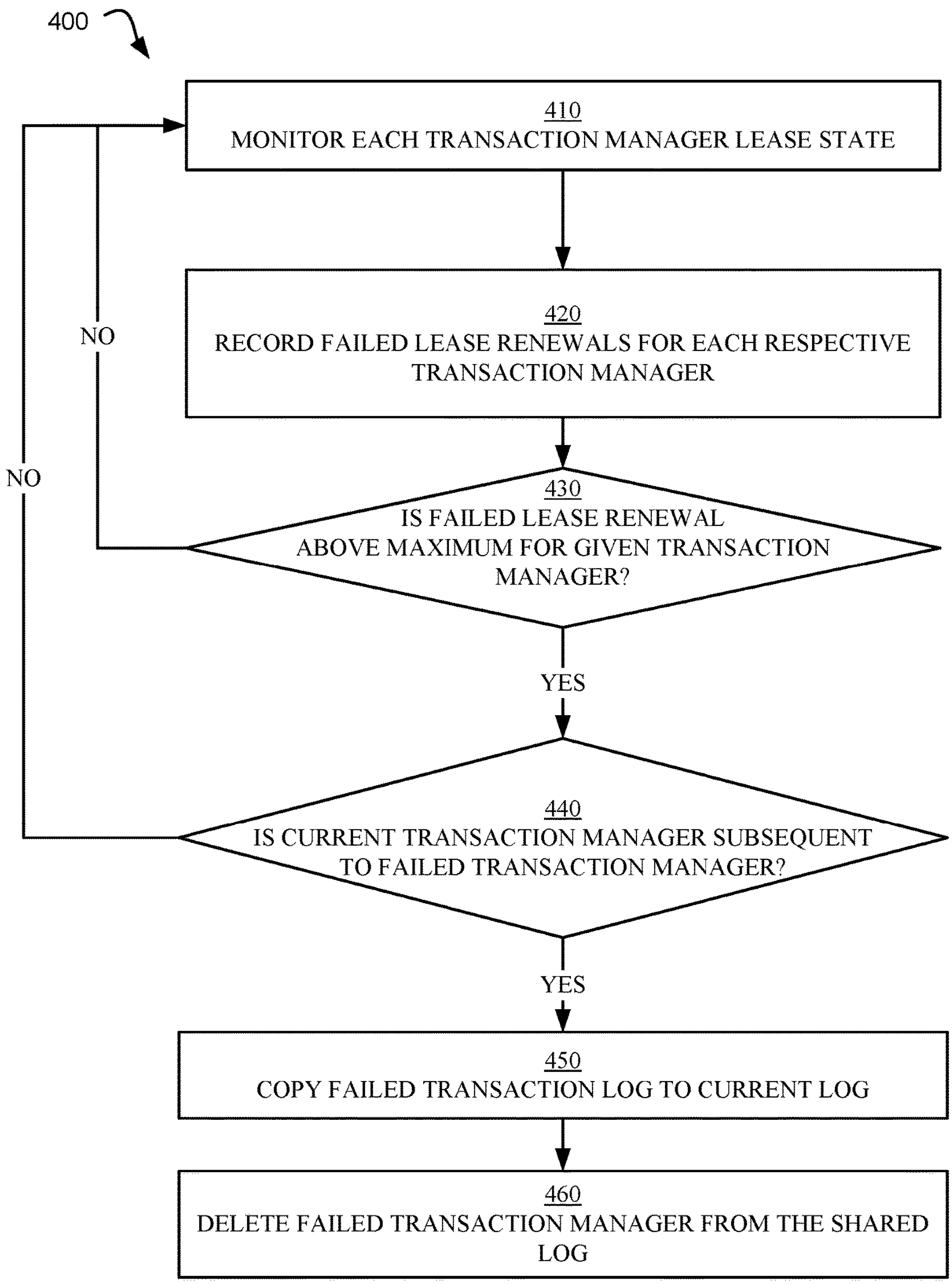
FIG. 4 illustrates a flowchart of an example method 400 for monitoring leases in accordance with embodiments of the present disclosure.

Referring now to FIG. 4, illustrated is a flowchart of a method 400 for monitoring leases in accordance with embodiments of the present disclosure. In embodiments, the method 400 can be executed by one or more processors (e.g., processors 105 of FIG. 1) according to a set of instructions (e.g., lease monitoring instructions 166 of FIG. 1). In some embodiments, the method 400 is a subroutine of operation 210 of FIG. 2 and can operate in parallel to the other operations shown in the method 200 of FIG. 2.

The method 400 can begin with operation 410 in which a first transaction manager monitors the lease status of a plurality of transaction managers using a shared log (e.g., shared log 136 of FIG. 1). The shared log can show the local time of the last lease refresh of each respective transaction manager of the plurality of transaction managers. In embodiments, the first transaction manager can check the shared log each monitoring time interval. In embodiments, the monitoring time interval can be greater than the lease refresh time interval and less than the lease expiration time interval.

In operation 420, the first transaction manager can record failed lease renewals for each respective transaction manager. The transaction manager can determine if a second transaction manager fails to renew its lease based on the difference in time between the last time a respective transaction manager logged a lease refresh and the current time.

For example, assume time starts at zero and the lease refresh time interval is 60 seconds and the monitoring time interval is 90 seconds. If after 180 seconds the respective entry of the respective transaction manager in the shared log states 60 seconds, then the respective transaction manager failed to update its respective entry in the shared log (i.e., to renew its lease) at least once. If after 180 seconds the respective entry of the respective transaction manager in the shared log states 120 seconds, then the respective transaction manager may have failed to renew the lease (e.g., failed to renew the lease at 180 seconds), or the clock of the respective transaction manager and the clock of the monitoring log of the first transaction manager may be unsynchronized. In such a case, embodiments can include tolerances associated with respective monitoring intervals to account for latencies associated with, for example, clock drift between unsynchronized clocks.

Operation 430 can determine if, for a respective transaction manager, the number of failed lease renewals is above a threshold for failed lease renewals (e.g., a maximum failure count). Should operation 430 determine the number of failed lease renewals is not above the maximum failure count, the method 400 can return to operation 410. Should operation 430 determine the number of failed lease renewals for a respective transaction manager is above the maximum failure count, the method 400 can proceed to operation 440.

Operation 440 can determine if the first transaction manager is subsequent to the respective transaction manager having a number of failed lease renewals above the maximum failure count. In embodiments, the ordering of various transaction managers can be determined by transaction manager IDs, organization of various transaction managers in the shared log, or by other techniques. In some embodiments, modulo operations are used to ensure, among other things, that a transaction manager located at the start of a list can identify itself as the "subsequent" transaction manager to a transaction manager located at the end of the list.

Should operation 440 determine that the current transaction manager is not subsequent to the respective transaction manager having a number of failed lease renewals above the maximum failure count, then the method 400 can return to monitoring each transaction manager in operation 410. Should operation 440 determine that the current transaction manager is subsequent to the respective transaction manager having a number of failed lease renewals above the maximum failure count, then the method 400 can proceed to operation 450.

In operation 450, the current transaction manager can copy the transaction log of the respective transaction manager having a number of failed lease renewals above the maximum failure count. In operation 460, the current transaction manager can delete the entry in the shared log instance associated with the failed transaction manager and/or the transaction log of the failed transaction manager and/or copy some of this log. In embodiments, the current transaction manager can subsequently complete the ongoing transactions started, though not completed, by the failed transaction manager.

Thus, the method 400 illustrates a method for monitoring the lease status of respective transaction managers by recording failed lease refreshes, comparing the number of failed lease refreshes to a threshold, and if necessary, overtaking a failed transaction manager and the transactions being processed though not completed by it.

FIG. 5A illustrates an example transaction log 500A such as transaction log 134 of FIG. 1. Transaction log 500A illustrates an example transaction log for a transaction manager 2_0. In embodiments, the transaction log 500A can be stored in a physical memory or a virtual memory (e.g., memory being leased by transaction manager 2_0) of the transaction manager 2_0. The transaction log 500A can contain a transaction identifier (ID) field 510A and a value field 512A which include a respective transaction ID and corresponding value for each respective transaction that the transaction manager 2_0 executes. Although two transaction IDs 520A (i.e., A_1 and X_n) are shown in the transaction ID field 510A, any number of transactions are possible. Furthermore, the transaction IDs 520A can comprise numeric, alpha-numeric, alphabetical, binary, or other identifiers for each respective transaction. The transaction values 522A can comprise a description of the transaction, such as, for example, a request to one or more databases (DBs), or storing information in a message queue (MQ). In embodiments including the method 400 of FIG. 4, the transaction log 500A of a failed transaction manager can be copied by an operational transaction manager, and the operational transaction manager can use the transaction log to complete one or more pending transactions from the failed transaction manager.

FIG. 5B illustrates an example transaction manager shared log 500B such as shared log 136 of FIG. 1. The transaction manager shared log 500B can contain a transaction manager worker identification (ID) field 510B and a time field 512B for each respective instance in the transaction manager shared log 500B. The time field 512B can comprise the last local time each respective transaction manager refreshed its lease. Each transaction manager can attempt to renew its lease every lease refresh time interval. For example, FIG. 5B uses a lease refresh interval of 60 seconds.

The first instance 520B (labeled 0) can be a special instance comprising an index of all active transaction manager IDs 550B (e.g., a list of the table keys). Atomic access to this index can use a single resource transaction application programming interface (API) (e.g., Java Database Connectivity (JDBC)). Although shared log 500B contains two transaction managers (i.e., 1_0 and 2_0), any number of transaction managers are possible.

In instance 522B, transaction manager 1_0 can be created at time 0. Likewise, in instance 524B, transaction manager 2_0 can be created at time 0. In instance 526B, transaction manager 1_0 can refresh its lease at 60 seconds. At instance 228B, transaction manager 2_0 can refresh its lease at 61 seconds. The one second discrepancy between instance 526B and instance 528B can represent latencies in respective transaction managers and the shared log due to, for example, clock drift and/or other factors resulting in unsynchronized clocks and/or different network latencies.

In instance 530B, transaction manager 1_0 can fail to refresh its lease, and thus, the time remains at 60 seconds. Transaction manager 1_0 can fail to refresh its lease due to, for example, a network partition or another factor which would disrupt connectivity between the transaction manager and the virtual resource. In contrast, in instance 532B, transaction manager 2_0 successfully refreshes its lease and logs the time at 121 seconds. In instance 534B, transaction manager 1_0 fails to refresh its lease a second time. In contrast, in instance 536B, transaction manager 2_0 successfully refreshes its lease and logs the time at 181 seconds. In instance 538B, transaction manager 1_0 fails to refresh its lease a third time. In instance 540B, transaction manager 2_0 successfully refreshes its lease and logs the time 241 seconds. In instance 542B, transaction manager 1_0 fails to refresh its lease a fourth time. In instance 544B, transaction manager 2_0 successfully refreshes its lease and logs the time at 301 seconds.

Thus, shared log 500B can record a time associated with each respective lease renewal of each respective transaction manager. The shared log can be used by the various transaction managers to monitor the operability of other transaction managers.

FIG. 5C illustrates an example monitoring log 500C in accordance with embodiments of the present disclosure. Monitoring log 500C can be the same or substantially the same as monitoring log 138 of FIG. 1. In embodiments, each transaction manager of a plurality of transaction managers can store a respective monitoring log in a physical or virtual (e.g., procured by a lease) storage medium. Each monitoring log can retrieve lease refresh data for each respective transaction manager of the plurality of transaction managers from the shared log (e.g., shared log 136 of FIG. 1 or shared log 500B of FIG. 5B).

Monitoring log 500C can store transaction manager worker identifiers (IDs) in a transaction manager worker ID field 510C. The transaction manager worker identifiers can be obtained from, for example, the special instance (e.g., 520B) of the shared log 500B containing an index of transaction managers (e.g., 550B). The monitoring log 500C can contain a respective time field 512C. The time can represent a monitoring time. In some embodiments, the monitoring time is greater than the lease refresh time. For example, the lease refresh time in the shared log 500B is 60 seconds while the monitoring time in the monitoring log 500C is 90 seconds. The monitoring log can contain a failed lease renewal counter field 514C. The failed lease renewal counter can count the number of failed lease renewals for each respective transaction manager at each respective monitoring time interval based on data retrieved from the shared log 500B.

Although the monitoring log 500C for transaction manager 2_0 only contains data regarding transaction manager 1_0, the monitoring log 500C can compile lease renewal data from any number of other transaction managers being stored in the shared log 500B. Instance 520C can record the transaction manager 1_0 lease status at a first time interval occurring at 90 seconds. The failed lease renewal count is 0 since transaction manager 1_0 successfully refreshed its lease at 60 seconds as shown in the shared log 500B at instance 526B. Instance 530C can record 1 failed lease renewal for transaction manager 1_0 at second monitoring time interval 180 seconds corresponding to the first failed lease occurring at instance 530B of FIG. 5B.

As will be noted, the lease refresh interval of 60 seconds and the monitoring interval of 90 seconds can overlap at the third iteration of the lease refresh interval and the second iteration of the monitoring interval at 180 seconds. Thus, although transaction manager 1_0 fails to renew its lease at the 180 second lease refresh time interval, this failure may not be counted until the next monitoring interval (i.e., at 270 seconds) to ensure the monitoring log does not incorrectly count a lease renewal failure in cases where the lease was successfully renewed but documentation of the renewal in the shared log 500B was delayed by message latencies.

Instance 540C can record a second and third failed lease renewal corresponding to instances 534B and 538B of the shared log 500B. Instance 550C can log the fourth failed lease renewal corresponding to instance 542B of the shared log 500B.

If, for example, the maximum failure count is 4, the instance 550C could trigger the method 400 of FIG. 4. In such a case, transaction manager 2_0 can recognize that transaction manager 1_0 is above its maximum failure count and also determine that transaction manager 2_0 is subsequent to transaction manager 1_0 (i.e., operations 430 and 440, respectively, of FIG. 4). As a result, transaction manager 2_0 can overtake processing of transactions previously associated with transaction manager 1_0.

Likewise, in accordance with the method 300 of FIG. 3, transaction manager 1_0 can recognize that it has exceeded the maximum failure count and restart itself (i.e., operations 340 and 350 of FIG. 3). During restart, transaction manager 1_0 can log a new incarnation in the shard log and attempt to procure a lease.

Figure 6:
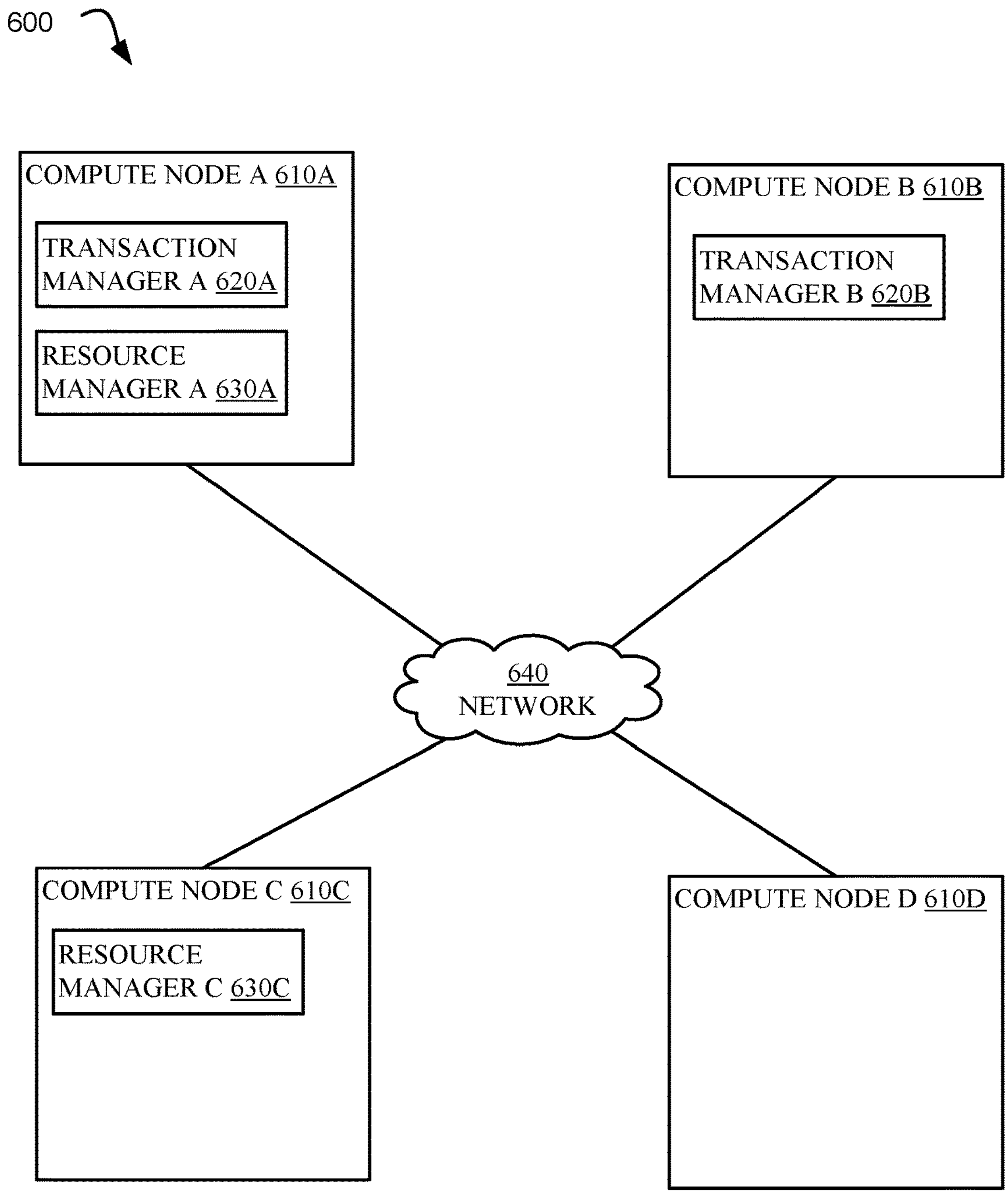
FIG. 6 illustrates an example system in accordance with embodiments of the present disclosure.

Referring now to FIG. 6, illustrated is an example system in accordance with embodiments of the present disclosure. The system 600 can include one or more compute nodes (also referred to a computing resources herein) such as compute node A 610A, compute node B 610B, compute node C 610C, and compute node D 610D. The system 600 can further include a plurality of transaction managers such as transaction manager A 620A and transaction manager B 620B. In embodiments, transaction manager A 620A and transaction manager B 620B are consistent with transaction manager 100 of FIG. 1. The system 600 can further comprise a plurality of resource managers such as resource manager A 630A and resource manager C 630C. The plurality of compute nodes can be connected to the plurality of transaction managers and resource managers via a network 640. In embodiments, the network 640 can be a physical network or a virtual network. In embodiments, respective transaction managers and respective resource managers can be hosted by a compute node, or respective transaction managers and respective resource managers can comprise respective compute nodes individually.

In embodiments, respective compute nodes can include one or more transaction managers and/or one or more resource managers. For example, compute node A 610A includes both transaction manager A 620A and resource manager A 630A. In a second example, compute node B 610B includes transaction manager B 620B. In a third example, compute node C 610C includes resource manager C 630C. In a fourth example, transaction manager D 610D includes neither a transaction manager nor a resource manager.

Although not shown, a respective transaction manager can comprise a plurality of compute nodes where the respective transaction manager comprises a set of virtual resources. For example, a respective transaction manager could utilize memory available on a first compute node and computing power available on a second node. Likewise, although not shown, a respective resource manager can comprise a plurality of compute nodes where the respective resource manager can utilize resources from the plurality of compute nodes.

In embodiments, compute nodes 610A-610D can comprise computing resources which are, in whole or in part, dedicated to respective transaction managers for a duration of a respective lease. Thus, respective compute nodes such as compute nodes 610A-610D can execute (according to instructions stored in a transaction manager) methods such as the methods shown and described in FIGS. 2-4 and can store data (according to instructions stored in a transaction manager) such as the data shown and described in FIGS. 5A-5C.

Thus, FIG. 6 illustrates an example system in accordance with embodiments of the present disclosure. The system 600 can include a plurality of computing resources (e.g., compute nodes A-D 610A-610D), a plurality of transaction managers (e.g., transaction managers A-B 620A-620B), and a plurality of resource managers (e.g., resource manager A 630A and resource manager C 630C). The computing devices, transaction managers, and resource managers can be communicatively coupled to one another via a network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
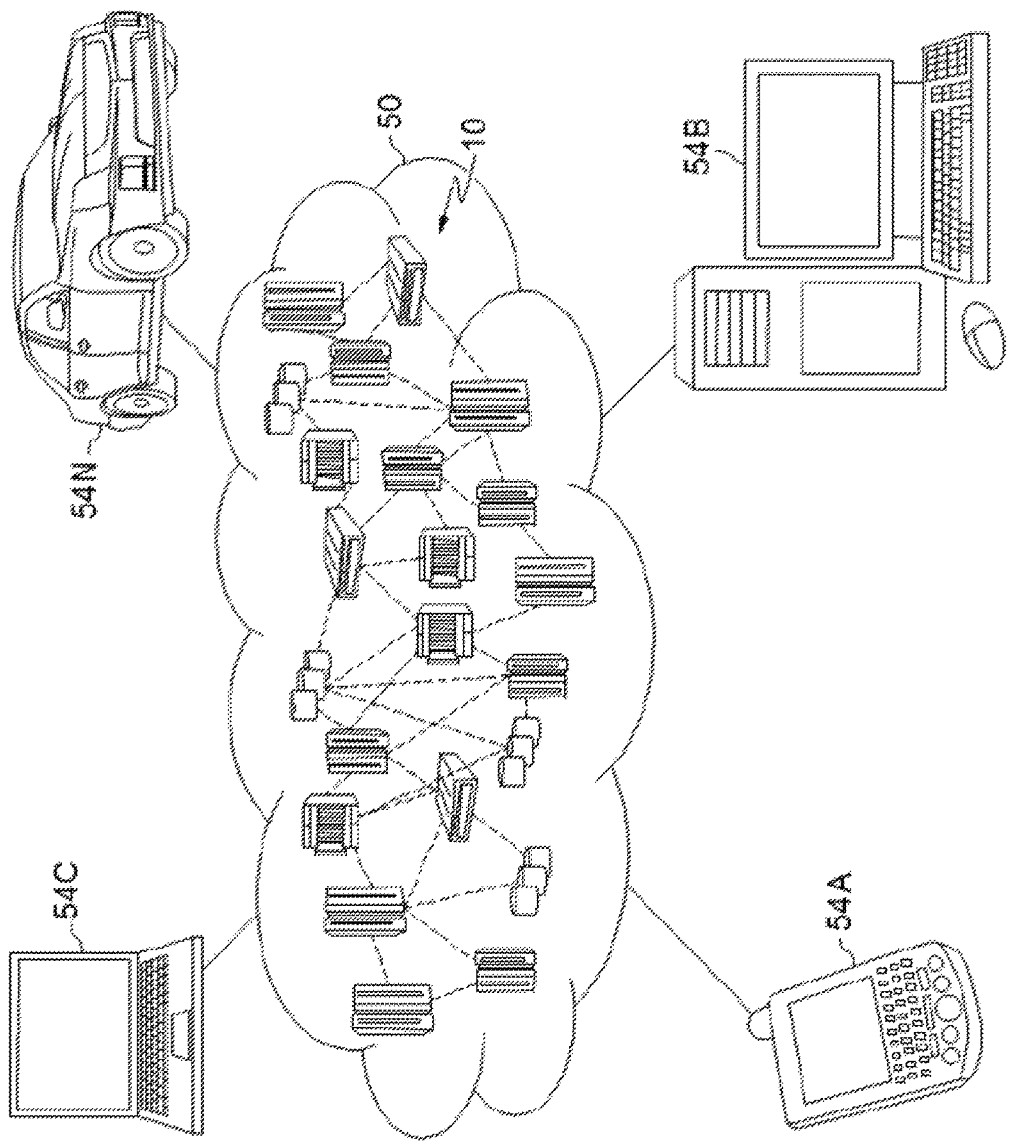
FIG. 7 depicts a cloud computing environment in accordance with embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser). In embodiments, the methods shown and described with respect to FIGS. 2-4 can be implemented on various nodes 10 of cloud computing environment 50. Likewise, logs illustrated in FIGS. 5A, 5B, and 5C can be stored in one or more nodes 10 of cloud computing environment 50 in some embodiments.

Figure 8:
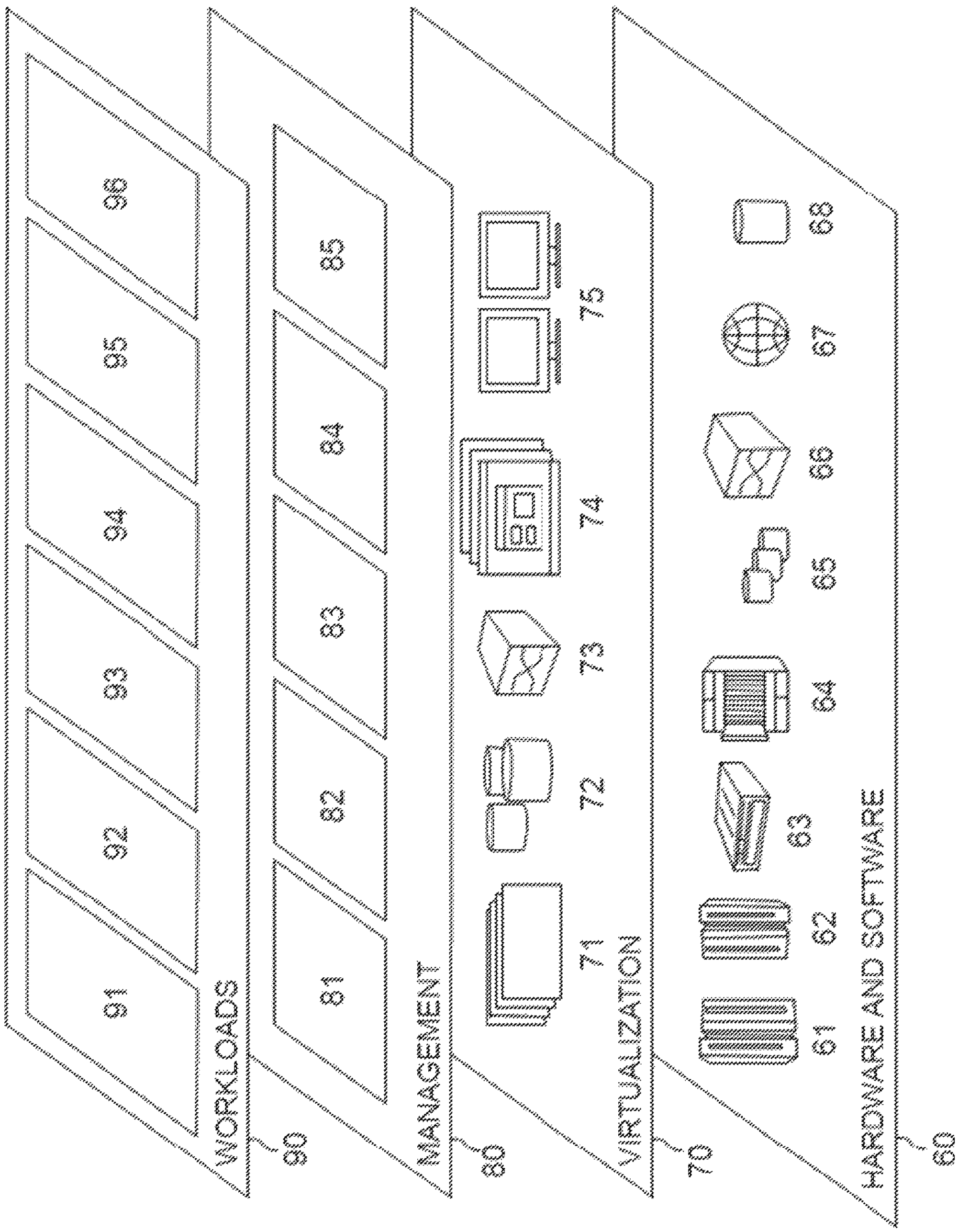
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and lease-based transaction processing 96. In some embodiments, workload lease-based transaction processing 96 can implement methods such as the methods shown and described with respect to FIGS. 2-4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:

procuring a first lease comprising a set of virtual resources committed to a first transaction manager for a first time interval, the procuring including:

renewing the first lease at each lease refresh time interval;

failing to renew the first lease at a respective lease refresh time interval;

recording a lease renewal failure;

determining a number of lease renewal failures is above a maximum lease renewal failure threshold; and restarting the first transaction manager; and sending, by the first transaction manager and to one or more resource managers, a commit request for a first transaction;

storing each respective response to each respective commit request in a virtual resource of the first lease;

determining each respective response is affirmative; and completing the first transaction.

2. The method of claim 1, further comprising;

monitoring each respective lease of each respective transaction manager of a plurality of transaction managers at each lease monitoring time interval; and recording each respective failed lease renewal of each respective transaction manager.

3. The method of claim 2, further comprising:

determining a number of failed lease renewals for a second transaction manager of the plurality of transaction managers is above a maximum lease renewal failure threshold;

determining the second transaction manager is sequentially previous to the first transaction manager;

copying a transaction log of the second transaction manager into a transaction log of the first transaction manager; and completing, by the first transaction manager, a transaction stored in the transaction log of the second transaction manager.

4. The method of claim 2, wherein the lease refresh time interval is less than the lease monitoring time interval.

5. The method of claim 1, wherein each respective resource manager comprises a database.

6. A system comprising:

a set of distributed computing resources connected via a network;

a plurality of resource managers;

a plurality of transaction managers communicatively coupled to the set of distributed computing resources and the plurality of resource managers, wherein each respective transaction manager is associated with a processor and a memory storing instructions;

a first transaction manager of the plurality of transaction managers, wherein a processor of the first transaction manager is configured to:

procure a first lease comprising a portion of the set of distributed resources for a first time interval, wherein the procuring includes monitoring the first lease by;

renewing the first lease at each lease refresh time interval;

failing to renew the first lease at a respective lease refresh time interval;

recording a lease renewal failure;

determining a number of lease renewal failures is above a maximum lease renewal failure threshold; and restarting the first transaction manager; and execute a transaction by causing the processor to:

request a commit from one or more respective resource managers to execute an operation associated with the transaction;

receive a respective response to each respective request;

store each respective response in a resource of the first lease; and determine each respective response is affirmative.

7. The system of claim 6, wherein to monitor the first lease the processor is further configured to:

write a local time of the first transaction manager to a shared log at each successful lease renewal;

wherein the shared log comprises a respective transaction manager identifier and a respective local time of the respective transaction manager at each respective instance, wherein the shared log is shared between each active transaction manager of the plurality of transaction managers.

8. The system of claim 7, wherein the processor of the first transaction manager is further configured to monitor each respective transaction manager of the plurality of transaction managers, wherein to monitor each respective transaction manager the processor is further configured to:

retrieve information from the shared log at each monitoring interval; and record, at each monitoring interval, a number of lease refresh failures for each respective transaction manager in a monitoring log, wherein the monitoring log is stored in a resource of the first lease.

9. The system of claim 8, wherein to monitor each respective transaction manager the processor is further configured to:

determine, at a respective monitoring interval, that a second transaction manager of the plurality of transaction managers has exceeded a maximum number of lease renewal failures;

determine the first transaction manager is sequential to the second transaction manager;

copy a transaction log of the second transaction manager into a transaction log of the first transaction manager; and complete the transaction in the transaction log of the second transaction manager by the first transaction manager.

10. The system of claim 6, wherein at least a portion of operations of each respective transaction manager are stored in a transaction log of the respective transaction manager, wherein the transaction log comprises a respective operation identifier and a respective operation description for each respective operation.

11. A computer program product comprising a computer-readable storage medium having program instructions embodied therewith, the program instructions executable by a processor and configured to cause the processor to perform a method comprising:

procuring, by a first transaction manager, a first lease comprising a set of virtual resources committed to the first transaction manager for a first time interval, the procuring including:

renewing the first lease at each lease refresh time interval;

failing to renew the first lease at a respective lease refresh time interval;

recording a lease renewal failure;

determining a number of lease renewal failures is above a maximum lease renewal failure threshold; and restarting the first transaction manager; and sending, by the first transaction manager and to one or more resource managers, a commit request for a first transaction;

storing each respective response to each respective commit request in a resource of the first lease;

determining each respective response is affirmative; and completing the first transaction.

12. The computer program product of claim 11, wherein the program instructions configured to cause the processor to procure a lease are further configured to cause the processor to perform a method further comprising:

renewing the lease at each lease refresh time interval, wherein the first transaction manager writes a local time to a shared log in response to each successful lease renewal, wherein the shared log is accessible to a plurality of transaction managers.

13. The computer program product of claim 12, wherein the program instructions are further configured to cause the processor to perform a method further comprising;

monitoring each respective lease of each respective transaction manager of the plurality of transaction managers at each lease monitoring time interval; and recording each respective failed lease renewal of each respective transaction manager in a monitoring log.

14. The computer program product of claim 13, wherein the program instructions are further configured to cause the processor to perform a method further comprising:

determining a number of failed lease renewals for a second transaction manager of the plurality of transaction managers is above a maximum lease renewal failure threshold;

determining the second transaction manager is sequentially previous to the first transaction manager;

copying a transaction log of the second transaction manager into a transaction log of the first transaction manager; and completing, by the first transaction manager, a transaction stored in the transaction log of the second transaction manager.

15. The computer program product of claim 13, wherein the lease refresh time interval is less than the lease monitoring time interval.

* * * * *